United States Patent [19]

Hilyard

[11] 3,837,670

[45] Sept. 24, 1974

[54] VEHICLE OCCUPANT RESTRAINING DEVICE

[75] Inventor: Gail D. Hilyard, Toledo, Ohio

[73] Assignees: Hugh A. Kirk; Robert E. Hilyard

[22] Filed: June 19, 1972

[21] Appl. No.: 263,864

[52] U.S. Cl................ 280/150 B, 297/384, 297/390
[51] Int. Cl............................................. B60r 21/08
[58] Field of Search.... 280/150 B, 150 SB, 150 AB; 297/384, 390; 296/84 K, 65 A

[56] References Cited
UNITED STATES PATENTS

| | | | |
|---|---|---|---|
| 2,037,303 | 4/1936 | Battee | 296/97 K |
| 2,661,221 | 12/1953 | Lockwood | 280/150 B |
| 2,778,896 | 1/1957 | Tollefsen | 280/150 B |
| 3,630,542 | 12/1971 | Wycech | 280/150 B |
| 3,640,572 | 2/1972 | Doehler | 280/150 B |
| 3,692,327 | 9/1972 | Barrick | 296/84 K |

FOREIGN PATENTS OR APPLICATIONS

| | | | |
|---|---|---|---|
| 964,471 | 5/1957 | Germany | 280/150 B |
| 1,065,793 | 1/1954 | France | 280/150 B |
| 1,318,721 | 1/1963 | France | 297/390 |

Primary Examiner—Robert S. Ward, Jr.
Assistant Examiner—Reinhard J. Eisenzopf

[57] ABSTRACT

The Hilyard Halter is an inverted U-shaped pendulum type of device which is pivoted at the outer ends of the U behind the back and below the head of an occupant in a vehicle and has a cushioned pad or net across the base of the U which is normally stored above the head of the occupant in the roof of the vehicle, and which in an emergency stop situation automatically quickly moves down in front of the occupant, by its own inertia and with aid, as well as extends to decelerate, surround and hold the occupant. The hubs for the pivoted frame are provided with adjustable spiral springs to increase the speed of action of the device, and the frame may be held from operation by adjustable spring applied balls in sockets around the hubs and/or solenoid operated catches that release when a given deceleration of the vehicle occurs. These hubs are also provided with stops for limiting the angular movement of the device. The legs of the U may be telescopic and provided with hydraulic pistons and-/or compression springs for aiding in the deceleration of the occupant together with the resiliency of the cushion pad or net across the base of the U.

9 Claims, 9 Drawing Figures

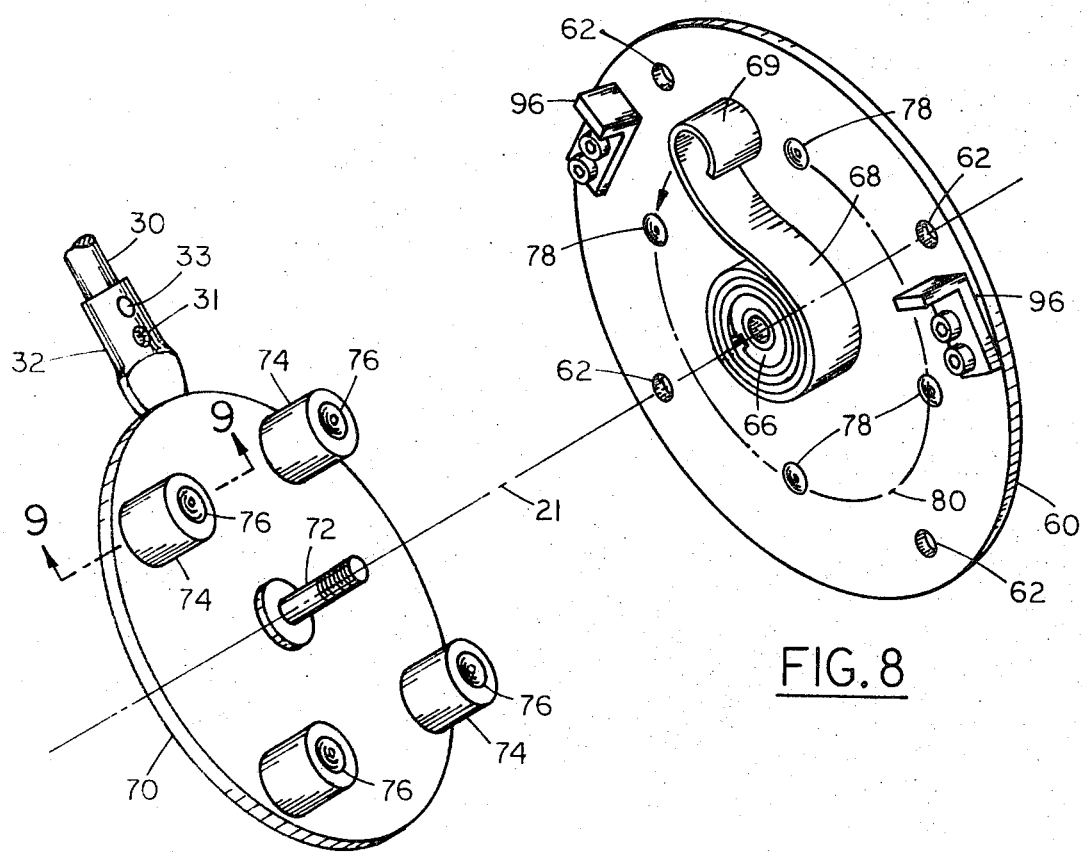
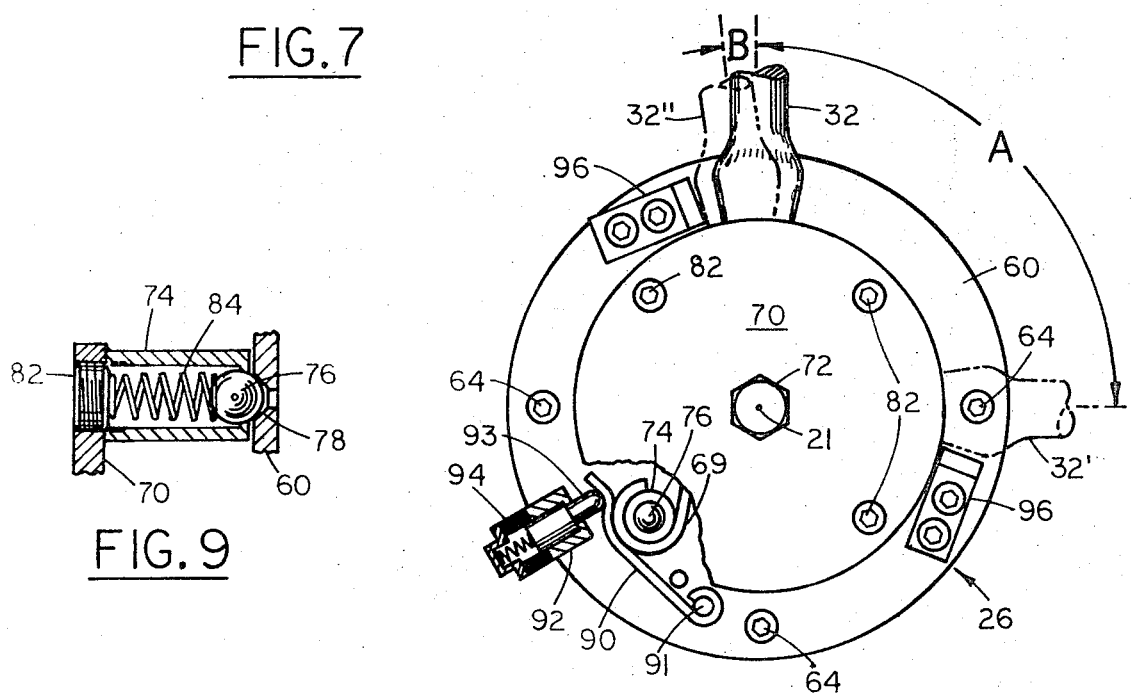

VEHICLE OCCUPANT RESTRAINING DEVICE

BACKGROUND OF THE INVENTION

Previously, automatic restraining devices for the occupants of vehicles usually have been mounted in front of the occupants so that in order to be placed in ther occupant restraining locations, forces greater than that of their inertia of decelerations were required, which forces also had to be sufficient to operate these devices in less than a tenth of second. Thus, the means necessary for the timely and effective operation of such devices were quite complicated and cumbersome, and not always reliable.

SUMMARY OF THE INVENTION

Generally speaking the crash protection device for an occupant of a vehicle comprises a pair of parallel levers or arms pivoted at one of their ends to an axis behind the back of the occupant, and a restraining pad or net connected between the other ends of said levers to produce a U-shaped frame which in its normal position is arched over the head of the occupant in the vehicle and in its operative position flies down in front of the occupant of the vehicle to surround and restrict the forward motion of the occupant so as to safely decelerate and prevent the occupant from being thrown out of the windshield or door or into the dash of a panic stopped vehicle. In order to insure the rapid speed of operation of this inverted pendular U-shaped frame, so that the frame will be in front of the occupant before the inertia of the occupant gets there, the mass of the frame is so located and pivoted that its own inertia will cause the frame to move into its operative position, which motion is aided and insured by pre-tensioned spiral springs in the hubs at the pivoted ends of each of the levers, which springs may be released either by a predetermined deceleration of the vehicle or by a separate positive releasing mechanism responsive to emergency situations, such as a solenoid connected to an inertia switch, the brake pedal, and/or the like. This hub also may include stop means to restrict the movement of the U-shaped frame. This U-frame device is so constructed to be easily manually reset by the occupant.

The levers or lever arms are preferably adjustable in length to fit different height vehicles, and are restrictively extendible by containing helical springs and/or shock absorbing devices in a pair of telescoping cylindrical tubes. Furthermore it is desirable that the outside of these levers be padded and/or upholstered to match the interior decor of the vehicle. The outer pad or net connecting the ends of these levers have T- or L-shaped extensions depending upon where these ends of the levers are connected to the pad or net supporting portions.

The padded means may comprise a resilient plastic or sponge rubber cushion of sufficient thickness i.e. several inches, to aid in the decleration of the occupant thrown against it. If a net is used which is of much less thickness than a cushion, it should stretch to aid in the deceleration of the occupant thrown against its flexible and resilient strands or webbing. This padding means or net also may be covered with a fabric material to match the interior trim of the vehicle, and may be slightly arched so that it will fit neatly against the roof of the vehicle and take up as little space as possible. The padding means or net may also be reinforced by cross straps of more rigid but flexible material, which straps may be either parallel and/or crossed between the T or L-shaped extensions on the levers, so as to insure simultaneous operation of both of the levers as a unit. Furthermore, one or both sides of the padding means or net may be connected by even stiffer members which also may act as a roll bar for when the U-shaped frame is in its inoperative position over the head of the occupant in vehicle.

The hubs for the two parallel levers of the U-shaped frame may each comprise a pair of spaced disk shaped members, one of which is rigidly attached to the back of the occupant's seat or to the sides of the frame of the vehicle and contains a socket bearing for the stubshafts or trunnions mounted in the center of the other or complimentary disk shaped member rigidly attached to the end of the lever or arm. In the space between these disk members and adjacent the periphery of one of them, preferably the one connected to the lever, are a plurality of evenly spaced bosses, each of which contains an adjustable spring applied ball that seats in a semi-spherical socket in the other disk member for maintaining the frame in its normal inoperative position and preventing its operation during normal decelerations of the vehicle. Attached to and located around the socket bearing of the other disk member is a spiral spring having its outer end attached to one of the bosses on the other disk member to place the U-shaped frame under tension so as to speed up its downward and forward action once the balls are released from their semi-spherical sockets by a deceleration greater than a pre-determine amount set by the springs applied to them. Instead of or together with these adjustable spring applied ball and socket restricting means, there may be mounted on the non-rotatable disk member a pivoted lever controlled by a solenoid, which lever hooks over one of the bosses on the other rotatable disk member to release the U-shaped frame for movement into its operative position. This particular solenoid may be a fail safe type and be operated by an inertia switch on the vehicle or a switch on the brake pedal, or the like. The non-movable disk member also may be provided with a pair of stops for restricting the angular motion of the other rotatable disk member, which motion may be slightly greater than 90° so that the U-shaped frame is responsive also to a rear end collision for releasing the balls from their sockets and catching the occupant from being thrown foward on a rebound.

OBJECTS AND ADVANTAGES

Thus the vehicle occupant restricting device of this invention surrounds the occupant and prevents him from being thrown against the dashboard, windshield and out of an open door of a car in the event of a collision or panic stop, caused either head on or from the rear. This device also protects the occupant from being hit by missiles flying in through the windshield or from the back of the car provided the seat behind the occupant also has a similar device. The device also may act as a roll bar in the event that the vehicle is being hit in the side, and thereby adds further reinforcing to the roof over the occupant's head. This device does not obstruct the forward and side vision of the occupant. It may be reset easily into its inoperative out-of-the-way position by the occupant, and may be covered with a fabric or sheet material to match the interior trim of the vehicle. It also may be adjustable, is easily adapted to fit different sized vehicles, and may be attached to either the frame of the vehicle or to the back of each seat or seats. Furthermore, this device is usable with normally installed seat belts and/or shoulder harnesses, and does not interfere with their operation. Not only may be it be used in automobiles and trucks, but also in other vehicles as trains and airplanes, and even on stairways, moving or stationary, to prevent falls of persons who miss a step.

One of the important advantages of the safety device of this invention is that its operation is helped by the rapid deceleration of the vehicle and by gravity, so that its operation does not require a great force to overcome these natural forces, but only enough force, which may be pre-adjusted, to insure that it is in its operative position in front of the occupant to be protected before the occupant moves into that position by his own inertia.

Therefore it is an object of this invention to provide a simple, efficient, effective, and economical and reliable occupant restraining device which normally is out of the way of the occupant in a vehicle, yet completely surrounds the occupant to be protected when it automatically snaps into its operative position under all emergency deceleration conditions.

BRIEF DESCRIPTION OF THE VIEWS

The above mentioned and other features, objects and advantages, and the manner of obtaining them are described more specifically below by reference to embodiments of this invention shown in the accompanying drawings, wherein:

FIG. 6 is an enlarged axial view of the hub of the device shown in FIGS. 1 through 4 with parts broken away of a positive releasing mechanism for the device;

FIG. 7 is a perspective view of the rotatable disk member of the hub shown in FIG. 6 that is connected to the lever arm of the device, showing its trunnion axle and ball retaining means;

FIG. 8 is a perspective view of the other stationary disk member of the hub shown in FIG. 6 that fits complimentary with the disk member shown in FIG. 7, showing the bearing for the trunnion and the spiral spring for increasing the speed of operation of the device once the balls are released from their respective sockets; and FIG. 9 is a further enlarged sectional view taken along line 9 — 9 of FIG. 7 showing how the pressure on the balls towards their sockets may be adjusted for normally maintaining the device in its inoperative position.

DETAILED DESCRIPTION OF PREFERRED EMBODIMENTS

Figure 1:
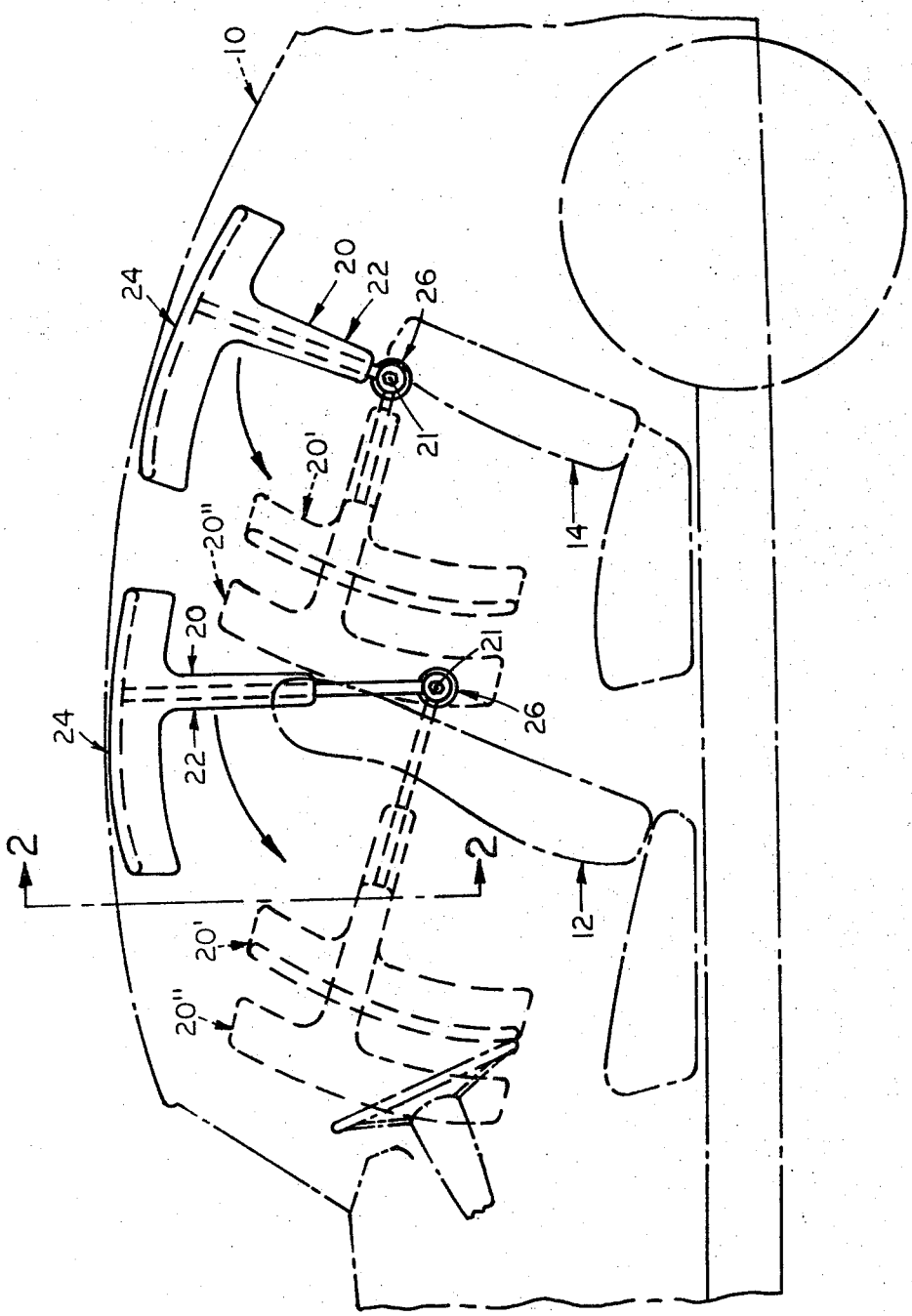
FIG. 1 is a schematic side elevation of a two-door motor vehicle shown in dot - dash lines, with a pair of one of the embodiments of the occupant restricting device of this invention shown in full lines installed therein, in their normal inoperative positions and shown in dotted lines in their two extreme operative positions.
Figure 2:
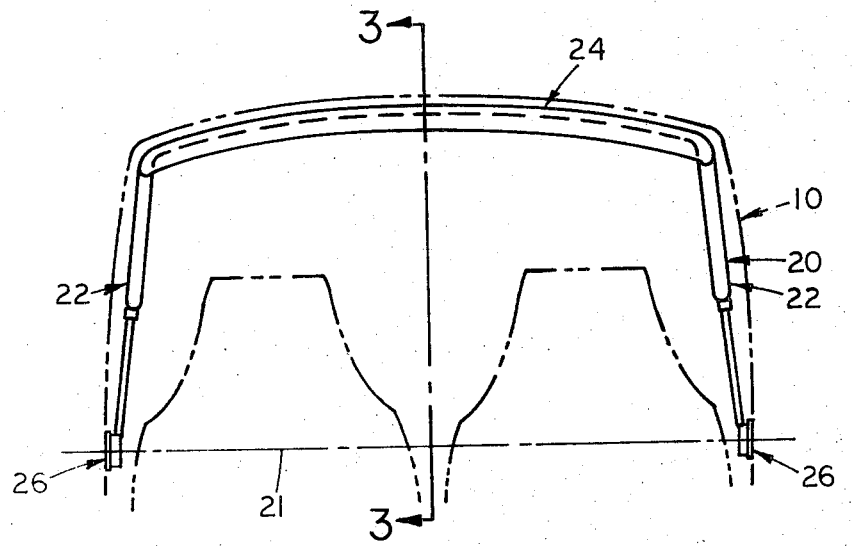
FIG. 2 is a view taken along line 2 — 2 of FIG. 1, showing how the occupant restricting device of this invention may be fastened to the frame of a vehicle and normally fits against the roof of the vehicle in its inoperative position.

Referring first to FIGS. 1 and 2 there is shown in dot - dash lines the partial outline of an automobile 10 having front and rear sets 12 and 14, respectively, with one embodiment of the occupant retaining device 20 being shown in full lines in its normal inoperative position pivoted to the frame of the automobile along their horizontal axes 21 behind the back of the occupant and the back of the seats 12 and 14. The telescopic lever arms 22 of the devices 20 are position along the inside of the sides of the body of the vehicle (see FIG. 2) and extend vertically upward from their pivotal axes 21 and with their occupant retaining flexible and resilient pads 24, such as of foam plastic or rubber, positioned beneath the roof or ceiling of the vehicle. Thus each restraining device 20 comprises a substantially U-shaped frame as more clearly shown in FIG. 2 which in its inoperative position is out-of-the-way of the occupants of the vehicle for their normal ingress, egress, and traveling in the vehicle 10.

In the event of an emergency or panic stop of the vehicle 10, the devices 20 are thrown foward into their dotted line positions 20' in front of the occupants in the seats 12 and 14 before these occupants can move forward by their own inertia, and then as these occupants are thrown into the padding 24 it compresses and the telescoping arms 22 extend into their positions 20" as shown in FIG. 1 to gradually decelerate the occupants to prevent internal injury and shock to the occupants. The free ends of the U-shaped frame of each device 20 are shown here fastened to the frame of the vehicle 10 by their hub means 26, the details of which are described later in connection with FIGS. 6 through 9, but these hub means 26 may be fastened to the back sides of the seats 12 and 14, or individual bucket type seats so the device can be movable with such seats without departing from the scope of this invention.

Figure 3:
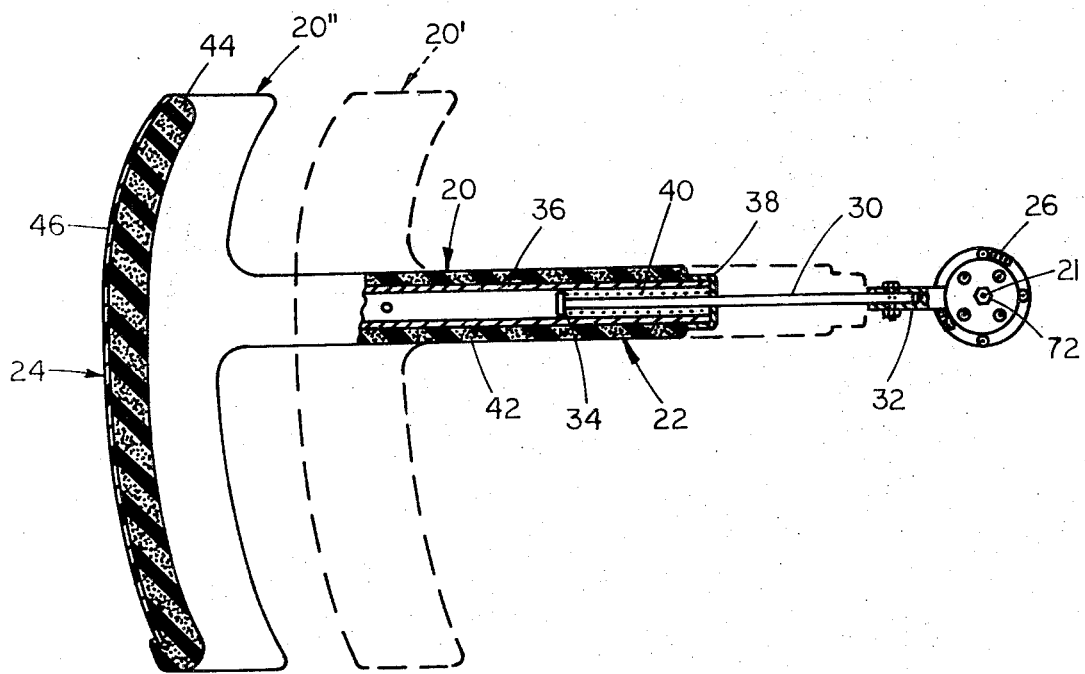
FIG. 3 is an enlarged sectional view taken along line 3 — 3 of FIG. 2 with the device shown in full lines in its fully extended operative position, and in dotted line in its non-extended operative position, and with parts of its arm broken away to show a restricting extending device therein.

Referring now to FIG. 3, there is shown one arm 22 and part of the padding 24 of the restraining device 20 shown in FIGS. 1 and 2, in which the telescoping lever or arm 22 comprises a rigid rod, bar, or piston member 30 one end of which may be axially adjustably connected into a socket 32 attached to hub member 26. There is shown in more detail in FIG. 7, this socket 32 having a bolt or rivet 33 which may be placed in any one of a plurality of holes 31 along the bar 30 to permit adjustment of the length of the whole lever mechanism 22, depending upon the height between the pivot axis 21 and ceiling of the vehicle 10 in which it is mounted, thus making the device 20 adaptable to different sizes of vehicles without re-constructing the lengths of the arms 22.

The other end of this piston or rod 30 may be provided with a piston head 34 which is slidable in a hollow cylindrical portion 36 having a cap 38 apertured in its center for slidably journalling the rod 30. Between the cap 38 and the piston head 34 there is provided motion restricting means, such as a helical compression spring 40 to restrict the forward movement of the arm portion 36 and pad 24 from its dotted line position 20' to its full line position 20'' for gradually decelerating the occupant thrown into the pad 24. If desired the cylinder 36 may be filled also with a hydraulic fluid and the piston head 34 may be valved for restricting the flow of the fluid to further dampen and/or retard the extensible movement of the leg or arm 22 as a hydraulic shock absorber. Around the outside of the cylindrical member 36 there may be provided a padding material 42, which may be similar to the padding material 44 provided on the inside of the pad 24 to prevent bruising of the occupant if thrown against the arms 22. This padding material as well as pad 24 may be covered with a decorative fabric to match the fabric sheeting of the interior decor of the vehicle 10. The pad portion 24 may be curved both longitudinally and transversely to fit the contour of the ceiling of the vehicle, and the forward outer surface of the padding portion 24 may be re-enforced with a more rigid sheet material 46 of glass fiber reinforced plastic or metal, which is rigidly connected at its sides to the outer ends of the tubular or cylindrical members 36 of the arms 22.

Figure 4:
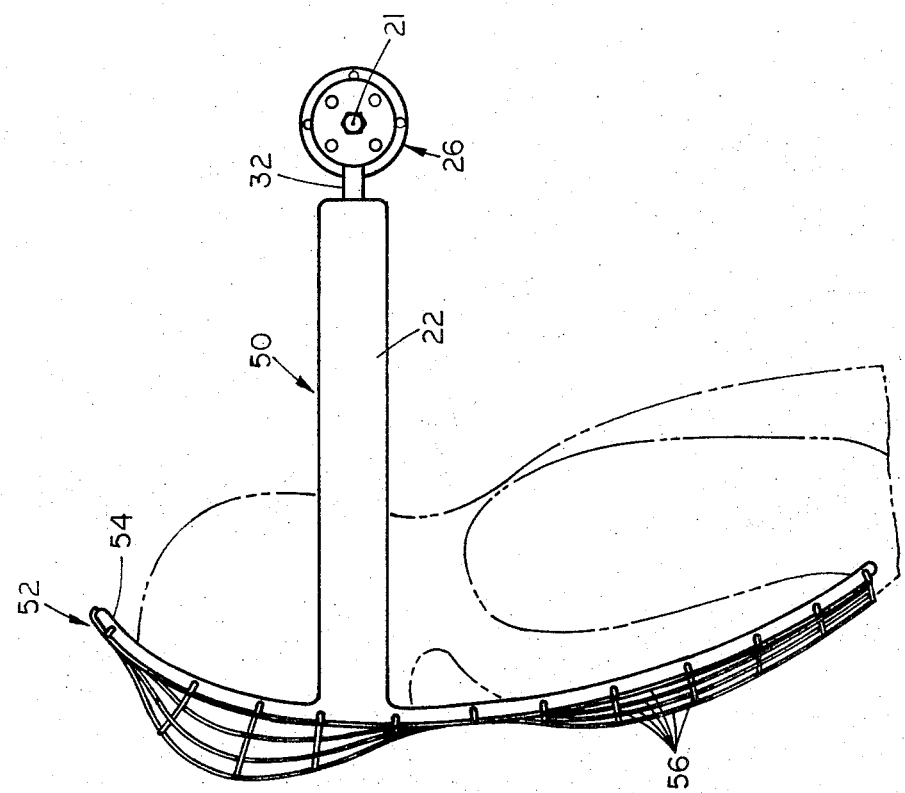
FIG. 4 is a view similar to that shown in FIG. 3, but of another embodiment of this invention wherein the padding between the arms of the deivce has been replaced by a net, and showing an occupant being held by such a net.
Figure 5:
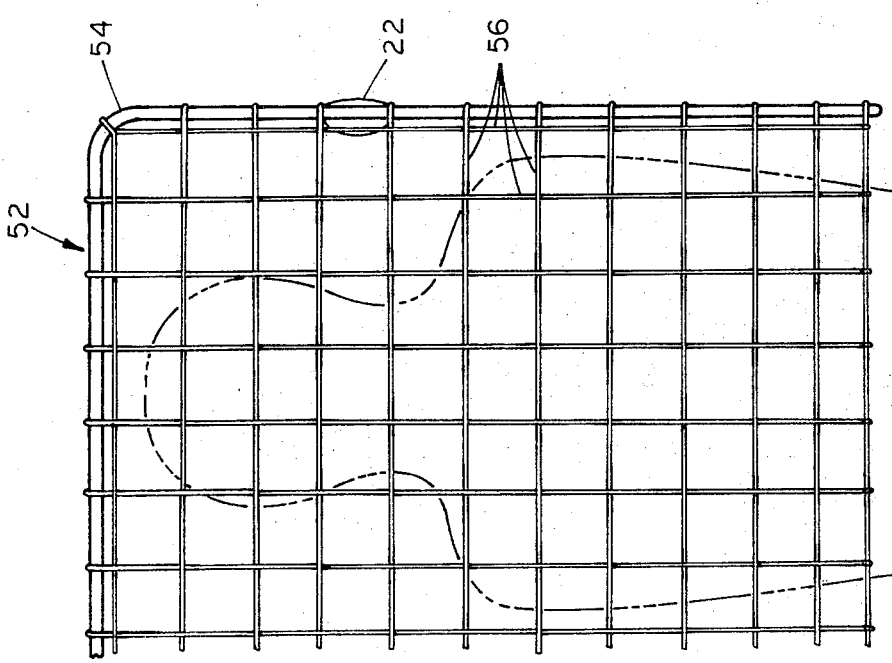
FIG. 5 is a front elevation of a portion of the net shown in FIG. 4.

Referring now to FIGS. 4 and 5, there is shown another embodiment of an occupant restraining device 50 of this invention in which the padding 24 in the device 20 is replaced by a resilient netting 52 woven or tied to a U-shaped frame 54 that need not be as thick as the padding 24 and thereby takes up less space in the vehicle. The legs of this frame 54 are rigidly connected to the outer ends of the telescopic arms 22. This netting 52 may comprise interwoven plastic or fabric cords 56 which have resiliency to aid in the deceleration of the occupant thrown against them, as shown in FIG. 4.

Furthermore the rigid arrangement of the bridging members comprising either the U-frame 54 shown in FIGS. 4 and 5, or the reenforced plastic or light metal concave member 46 shown in FIG. 3 may be sufficiently rigid to act also as a roll bar in the vehicle 10 in case the vehicle 10 overturns such as by being hit from the side. Thus the device 20 or 50 adds more strength to the ceiling of the vehicle 10 to restrict the cave-in thereof in the case of a sideways roll of the vehicle 10.

Referring now to FIGS. 6 through 9, details of the hub 26 are disclosed including means for increasing the speed of operation of the device as well as for restraining it from operating until a predetermined deceleration rate of the vehicle 10 occurs. This hub assembly 26 is shown herein to comprise a stationary base plate or disk member 60 which may be welded or bolted through bolt holes 62 by bolts 64 to the frame of the vehicle 10, or to the back of the seat 12 or 14 as shown in FIG. 1. The plate 60 has a central bearing or boss portion 66 (see FIG. 8) which may be of polytetrafluoroethylene or other low coefficient of friction material that does not require lubrication. Surrounding this bearing 66 and anchored thereto is one end of a spiral spring 68, the opposite end 69 of which is connected to the other disk member 70 from the periphery of which radially extends the socket 32 for the rod 30 of the lever arm 22. The center of this rotatable disk member 70 is provided with a stub shaft or trunnion 72 which journals in the bearing 66 and may be held therein by means of a nut (not shown) threaded onto the outer end of the shaft 72, which nut also holds the two disk member 60 and 70 together to form the hub unit 26. Near the periphery of the disk member 70 there may be provided a plurality of hollow bosses 74 in the necked outer ends of which may be held balls 76 which fit into the semi-spherical sockets 78 in the base or stationary disk member 60. These sockets 78 may be connected by a circular grooved track 80, to guide the relative rotation between the disk member 60 and 70. At the other end of each of the ball containing bosses 74, there may be internally threaded set screws 82 (see FIG. 9) for adjusting the compression of the helical springs 84 that urge the balls 76 into their sockets 78. The outer end 69 of the spiral spring 68 may be anchored to one of these bosses 74 (see FIG. 6), so that once the balls 76 are freed from their sockets 78 the spring 68 immediately urges the whole U-shaped frame of device 20 or 50 into its operative position 20' as shown in FIGS. 1 and 3.

Together with or instead of the balls 76 and sockets 78, there may be provided a pivoted lever mechanism 90 (see FIG. 6) pivoted to the plate 60 at 91 which partially hooks over one of the bosses 74 and/or end 69 of the spiral spring 68 to retain it from operating. This lever 90 may be held into hooking engagement with the boss 74 and/or end of spring 68 by a spring urged plunger 93 of a solenoid 92 as long as its coil 94 is energized. Thus, in the event of current failure, or any other deenergization of the solenoid 94, the safety device 20 or 50 will permit the hooking lever 90 to release the spiral spring 68 to move the device into its operative occupant retaining position 20'. The coil 94 of the solenoid 92 thus may be connected with an electric switch which may be controlled by a switch (not shown) operated by an inertia device mounted on the vehicle 10 and/or operated by the brake pedal or lever of the vehicle which latter switch operates only in case the brake is operated beyond a certain point, or at a certain speed, or both corresponding to a panic stop operation of the brakes.

Referring again to FIGS. 6 and 8, there is also shown mounted on the stationary plate or disk member 60 of the hub 26, a pair of stops 96 which may be adjustably bolted thereto for limiting the movement of the arm 22, or specifically the socket 32 therefor. One of these stops may limit the downward or forward operative angular movement A as shown in dotted line position 32' at the right in FIG. 6, while the other stop 96 may be spaced a slight arcuate distance B beyond the normal inoperative full line position of the socket 32 to its left dotted line position 32''. This slightly backward position 32'' permits the balls 74 to dislodge from their sockets 78 in case of a rear end collision and the resulting further wind up of the spiral spring 68 caused by this collision, will cause the balls 74 to override their sockets 78 and operate the occupant restraining device 20 or 50 to catch the occupant upon his rebound.

Furthermore it should be clearly understood that other types of restricting mehanisms for maintaining the device 20 or 50 in its inoperative position besides the balls 74 and sockets 78 and/or the lever 90 and solenoid 92 shown herein may be employed without departing from the scope of this invention.

While there is described above the principles of this invention in connection with specific apparatus, it is to be clearly understood that this description is made only

I claim:

1. An automatic restraining device for occupants seated in a vehicle during the unexpected rapid deceleration of the vehicle, said device comprising:
   A. a substantially U-shaped frame having resiliently extensible legs and a resilient base portion to decelerate the occupant caught in said frame at a lesser decelerating speed than that of said vehicle, said frame normally being located above the head and out of the way for free ingress and egress of the vehicle by occupant when said frame is in its inoperative position;
   B. means for pivoting said legs around a common axis located below the head and behind the back of said occupant, whereby said unexpected rapid deceleration of the vehicle causes said frame to move forwardly and downwardly towards its restraining position by gravity and its own inertia, each said pivoting means comprising a pair of relatively rotatable disks about an axle, one of which disks is attached to said vehicle and the other of which disks is attached to one of said legs of said U-shaped frame;
   C. a spiral spring wrapped around the axle between said disks for urging said frame into its operative position, one end of said spring being attached to said vehicle and the other end of said spring being attached to said disk attached to said leg;
   D. means for restraining said spring for holding said frame in its inoperative position under normal decelerating conditions, said restraining means comprising a plurality of ball and socket joint means, in which said balls are connected to one of said disks and are urged parallel to the axis of said pivoting means for seating into socket means on the other of said disks; and
   E. means for limiting the angular movement of said frame between a normal inoperative position above the head of said occupant to its operative position in front of said occupant.

2. A device according to claim 1 wherein said resilient base portion comprises a foamed plastic pad.

3. A device according to claim 1 wherein the resilient base portion comprises a net mounted in a frame.

4. A device according to claim 1 wherein said extensible legs comprise extensible telescopic members, and include means in each leg for restricting the extension of said members.

5. A device according to claim 4 wherein said restricting means include compression springs mounted between said telescopic members.

6. A device according to claim 1 wherein said legs comprise hydraulic shock absorbing means.

7. A device according to claim 1 wherein said means for pivoting said legs is mounted on the back of the seat for the occupant.

8. A device according to claim 1 wherein the means for pivoting said legs is mounted on the frame of said vehicle.

9. A device according to claim 1 wherein said limiting means comprises a pair of stops mounted on said one of said disks.

* * * * *